United States Patent [19]

Worth et al.

[11] Patent Number: 4,798,314

[45] Date of Patent: Jan. 17, 1989

[54] DISPENSING VALVE WITH TUBULAR SEAL

[75] Inventors: John N. Worth, Bolnhurst, England; Jorn Steffensen, Helsingor, Denmark

[73] Assignee: W. R. Grace & Co., Lexington, Mass.

[21] Appl. No.: 89,388

[22] Filed: Aug. 26, 1987

[30] Foreign Application Priority Data

Sep. 5, 1986 [GB] United Kingdom ............... 8621470

[51] Int. Cl.$^4$ .............................................. F16K 41/00
[52] U.S. Cl. .................................. 222/542; 251/214; 277/165; 222/559
[58] Field of Search ............... 222/504, 509, 510, 512, 222/518, 542, 559; 251/214, 319; 277/165

[56] References Cited

U.S. PATENT DOCUMENTS

| | | |
|---|---|---|
| 1,747,598 | 2/1930 | Popp . |
| 2,600,293 | 6/1952 | Heldal .................................. 277/117 |
| 2,646,245 | 7/1953 | Bedini .................................. 251/214 |
| 2,670,241 | 2/1954 | Pyles .................................. 251/240 K |
| 2,964,246 | 12/1960 | Alholm et al. ............... 222/504 UX |
| 3,048,362 | 8/1962 | Scarborough ...................... 251/214 |
| 3,073,490 | 1/1963 | Dahl et al. ....................... 222/504 X |
| 3,178,062 | 4/1965 | Welty et al. ..................... 222/509 X |
| 3,420,262 | 1/1969 | O'Neill, Jr. ...................... 251/214 X |
| 3,463,363 | 8/1969 | Zelna ................................. 222/504 |
| 3,469,825 | 9/1969 | DuBois ........................... 251/214 X |
| 3,945,393 | 3/1976 | Teatini .............................. 137/220 |
| 3,997,141 | 12/1976 | Baumann ........................... 251/205 |
| 4,285,498 | 8/1981 | Nightingale ...................... 251/214 |
| 4,392,633 | 7/1983 | Van Winkle ...................... 251/122 |

FOREIGN PATENT DOCUMENTS

| | | |
|---|---|---|
| 139851 | 1/1948 | Australia ............................ 251/214 |
| 63983 | 8/1892 | Fed. Rep. of Germany . |
| 141844 | 7/1966 | New Zealand . |
| 616280 | 1/1949 | United Kingdom . |

Primary Examiner—Kevin P. Shaver
Attorney, Agent, or Firm—John D. Hubbard; William L. Baker

[57] ABSTRACT

A seal for a longitudinally movable element such as a needle valve. The seal has an upper disc-like portion which is secured in place and a lower tubular extension. The tubular extension has an internal tapered bore such that the lower end of the bore is narrower than the upper end of the bore. The lower end of the bore intimately grips the outer surface of the longitudinally movable element and stretches and retracts with its movement.

5 Claims, 1 Drawing Sheet

DISPENSING VALVE WITH TUBULAR SEAL

The present invention relates to an improved seal, and in particular to a seal for use with an elongate member which is slidable into and out of a space in which a liquid is to be contained. One example of such a situation is that of a needle valve controlling the discharge of a liquid from within a chamber where the needle valve extends through the chamber from one side to the other.

In the past adequate sealing has been achieved, particularly in the case of a longitudinally movable elongate member, using a diaphragm seal where the diaphragm extends between the periphery of the elongate member and a surrounding housing. Such a situation is illustrated in FIG. 1 from which it can be seen that the space 1 under the diaphgram 2 will vary in volume considerably as the elongate member (needle valve member 3) to be sealed is longitudinally displaced in a vertical direction. In the case of controlled dispensing of a liquid from within the space 1 through a nozzle 4, the pressure within the space 1 will fluctuate giving undesirable fluctuations in the rate of discharge of the liquid introduced along the direction of arrow 5.

An alternative form of seal which has not been subject to this fluctuation in the volume of the space 1 is the stuffing box seal, in this case a chevron shaft seal, shown at 2a in FIG. 2 which is another prior art arrangement. However, the fact that the needle valve member 3 slides relative to the chevron seals of the assembly 2a causes wear in the seals with the result that some of the liquid which has been introduced at 5 into the space 1 can escape vertically upwardly and, particularly in the case of liquids which may be shear-sensitive there is a risk of agglomeration of the material at the seal, with undesirable consequences.

It is an object of the present invention to provide a seal about a movable longitudinal member, which does not depend on sliding of the longitudinal member relative to the seal and equally does not involve the use of a membrane or diaphragm which flexes to vary the volume of the space around the elongate member.

According to the present invention there is provided a seal for an elongate member movable longitudinally relative to a housing, comprising an elongate annular seal member having an internal bore therealong, and means for clamping a first end of the elongate annular seal member relative to said housing, the elongate section having a distal end remote from the clamped end, arranged to contact the exterior of the longitudinally movable valve with the wall of said bore in the elongate annular seal member.

A preferred form of the present invention is a dispensing gun for a liquid composition, comprising a dispensing chamber for the liquid composition and a needle valve projecting across the chamber to close off a discharge orifice of the chamber from within the chamber, the point of entry of the needle valve member into the chamber being sealed by means of a seal in accordance with the present invention.

In order that the present invention may more readily be understood the following description is given, merely by way of example, with reference to the accompanying drawings in which.

Figure 3:
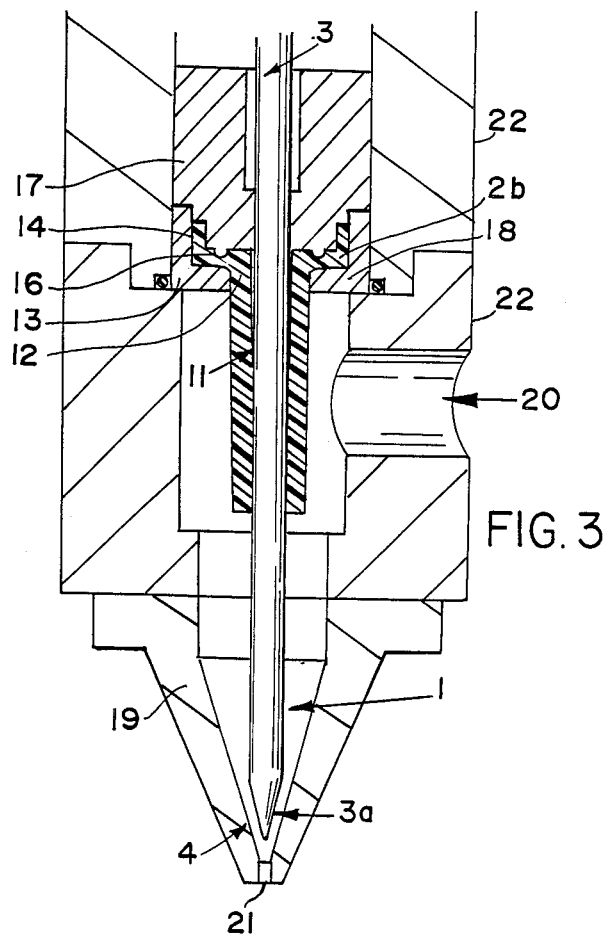
FIG. 3 is a similar view but showing a seal in accordance with the present invention.

Referring now to FIG. 3 which embodies the present invention, the seal 2b in this case comprises a long tubular extension 11 joined to a disc-like portion 12 which in turn is joined at 13 to an annular locating skirt 14. The seal 11, 12 is held within the dispenser body 22 of a dispensing gun for the liquid, by virtue of the disc-like portion 12 being clamped between a male seal clamping body 17 and a female clamping ring 18. The body 17 and ring 18 are held within the fixed housing of the dispenser body 22. An annular projection 16 of the male seal clamping body 17 locally compresses the upper surface of the disc-like portion 12 to increase the sealing pressure between the male seal clamping portion 17 and the disc-like seal portion 12.

In order to locate the seal in place, the male clamping body 17 fits into a recess of the female seal clamping ring 18 so as to trap the disc-like portion 12 and the locating skirt 14 of the seal 2b in place.

The housing of the dispenser has an inlet at 20 and is completed by a nozzle body 19 having a nozzle orifice 21 to be closed by the tip 3a of the longitudinally movable elongate needle valve member 3.

Once a liquid under pressure for dispensing through the nozzle orifice 21, has been introduced into the liquid-receiving space 1 its pressure will hold the lower end of the elongate sleeve portion 11 of the seal in contact with the cylindrical exterior of the longitudinally movable needle valve member 3. The elongate extension 11 is deliberately given an internal taper such that its interior is more likely to contact the needle valve member 3 near the lower end or tip of the extension 11 than it is higher up the needle valve member 3, thereby allowing some degree of longitudinal movement of the needle valve member 3 relative to the upper parts of the extension 11.

In use, the lower end of the extension 11 will intimately grip the exterior of the needle valve member 3 so that when the needle valve is moved downwardly the extension 11 will be stretched axially as the needle valve member 3 moves longitudinally within the interior of the extension 11. During this time the disc-like portion 12 and the locating skirt 14, being held in place by engagement of the male clamping body 17 and female seal clamping ring 18, ensure that the upper end of the extension 11 is held stationary relative to the axially movable lower end, giving rise to expansion and contraction of the extension 11. It should of course be appreciated that as the extension 11 expands and contracts longitudinally there will be a change in its external cross-section which will be in the form of a decrease when the length of the extension 11 is becoming larger, and vice versa.

It should also be noted that there is substantially no sliding of the interior wall surface of the extension 11 relative to the needle valve member 3 which it encloses, and thus there will be no wear of the fit of the seal in repeated use of the needle valve.

The needle valve may be operated by any suitable drive mechanism, for example by mechanical means, electrical means, pneumatic means, or hydraulic means, or a combination thereof.

Any suitable natural or synthetic elastomeric material may be used for the seal member 2b, and one example is neoprene; another is natural rubber.

Figure 1:
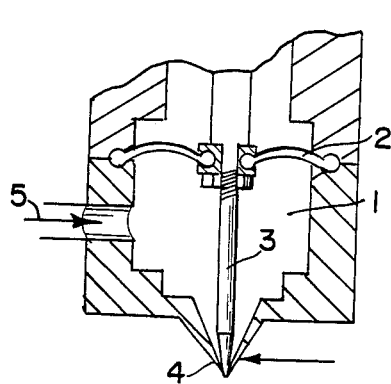
FIG. 1 is a vertical sectional view of a first prior art arrangement using a diaphragm seal.
Figure 2:
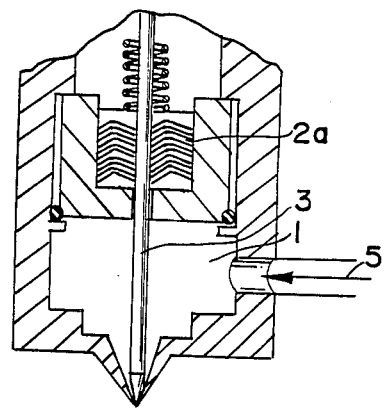
FIG. 2 is a view similar to FIG. 1 but showing a second prior art arrangement using a sliding chevron seal.

As indicated above, there are serious disadvantages in the use of the diaphragm seal shown in FIG. 1 or the stuffing box "chevron" type of seal shown in FIG. 2. With the FIG. 1 arrangement the diaphragm displaces vertically in such a way as to change the volume of the chamber 1 so that the pressure of the liquid in the chamber will also fluctuate and will give rise to undesirable changes in the rate of discharge through the nozzle orifice.

Experiments have proven that the present seal provides a better performance than the diaphragm with respect to the evenness of compound distribution on the can end. The results of these experiments are set out in Table 1 below showing typical peripheral weight distribution (mg) around a gasket lined with a nominal 2.2 turn lining. This means that the can end turned through a nominal 2.2 turns while the needle valve of the gun above it was open. Thus there was an area of a nominal 0.2 turns on which three layers of compound fell in place of the two layers everywhere else. The overlap area is contained in Octants 1 and 8 of Octants Nos. 1 to 8 given in Table 1. The weights quoted for the remaining Octants 2 to 7, and the average and standard deviation values for that set of Octants quoted in Table 1 illustrate the superiority of the present seal.

TABLE I

|   | Diaphragm | Present Seal |
|---|-----------|--------------|
| 1 | 13.4 | 11.1 |
| 2 | 11.1 | 7.7 |
| 3 | 5.6 | 7.7 |
| 4 | 6.8 | 7.6 |
| 5 | 7.4 | 7.9 |
| 6 | 9.2 | 7.9 |
| 7 | 9.4 | 7.7 |
| 8 | 10.6 | 9.2 |
| Av. | 8.25 | 7.75 |
| St Dev. (2-7) | 2.01 | 0.12. |

In fact the average for the full can end over Octants 1 to 8 was 9.2 using the diaphragm seal and 8.4 using the gaiter seal in accordance with the invention, and the standard deviation was 2.5 using the diaphragm seal and 1.2 using the present seal. Even over this range, which includes the unfavourable "overlap area" of Octants 1 and 8, there is a distinct improvement using the present seal in accordance with the invention.

The reason for this improvement using the present seal of FIG. 3 is thought to be that, in the diaphragm seal gun, as the needle valve 3 rises to open the nozzle orifice the pressure in the chamber 1 drops and hence the rate of discharge of the liquid composition from within the chamber 1 will drop until it can be restored as a result of the pressure recouperation of the continued feed into the chamber at 5. A further disadvantage is that even while the needle valve 3 is stationary the diaphragm is able to displace, for example by a fluttering movement when the valve is open, and thus the pressure varies undesirably.

An additional advantage of the present seal over the stuffing box seal when used with a gun operated independently of the machine, i.e. air operated via a solenoid, is that there is reduced friction between the needle and the flange seal area which provides for a more consistent operation.

With the FIG. 2 arrangement there is no such variation in volume of the chamber 1 but the sliding of the needle valve member 3 relative to the stuffing box seal assembly 2a will give rise to wear of the sliding fit and eventual leakage of liquid composition upwardly along the needle valve with a risk of contamination of the drive mechanism for the needle valve member 3. Furthermore, the high shear generated around the needle valve member 3 at the stuffing box assembly 2a and at the orifice of the surrounding part of the stuffing box support member 6 of FIG. 2, has been found to give rise to coagulation of the liquid composition being dispensed, particularly in the case of shear-sensitive compositions, such as water based dispersions, with the risk of coagulated particles of the composition being formed which may partially block the nozzle orifice 21 so as to reduce the rate of discharge of the contents of the chamber 1 or even completely block it. One example of a liquid composition which may be coagulated by the high shear forces generated in a seal of this type is a water based can sealing compound which may comprise an aqueous styrene-butadiene rubber latex, tackifying resin, filler, dispersant and thickening agent.

With the seal illustrated in FIG. 3, constructed in accordance with the present invention, no such change of volume disadvantage of FIG. 1 is noticed and equally there is substantially no risk of coagulation of the liquid composition or of contamination of the needle valve member drive mechanism through escape of liquid composition from the chamber 1 upwardly along the needle valve member 3.

When dispensing water based sealing compound for can lining, using a seal in accordance with the present invention, it has been found in preliminary tests that there are minimal pressure surges in the compound, to the extent that no problem arises, and nevertheless adequate seal is provided without any noticeable incidence of coagulation of the compound.

While this invention has been described with reference to its preferred embodiments, other embodiments can achieve the same result. Variations and modifications of the present invention will be obvious to those skilled in the art and it is intended to cover in the appended claims all such modifications and equivalents as fall within the true spirit and scope of this invention.

What we claim is:

1. A dispensing means for dispensing liquid compositions comprising a dispensing chamber having an inlet and an outlet, a longitudinally movable valve means intimately fitting into the outlet for sealing off the outlet, an actuating means for selectively moving the longitudinally movable valve means, a sealing means between the valve means and the actuating means to prevent egress of liquids to the actuating means, the sealing means having a first end adjacent the actuating means, the first end having a disc-like portion which is clamped to the dispensing chamber adjacent to the actuating means, the sealing means having a second end remote from the first end, the sealing means having an internal bore from the first end to the second end through which the valve means extends, the internal bore having a tapered cross section with a larger cross section near the first end and a narrower cross section near the second end and the valve means being intimately gripped by the internal bore of the sealing means at the second end.

2. The dispensing means as claimed in claim 1 wherein the outlet of the dispensing chamber is a nozzle located at a lower portion of the dispending chamber and the valve means is a needle valve.

3. A dispensing device comprising a fixed housing having a dispension chamber with an inlet and outlet, and an actuating chamber located above the dispensing chamber, the inlet being located in a lateral portion of the dispensing chamber, the outlet being located in a lowermost portion of the dispensing chamber, the outlet having a nozzle with a nozzle orifice, a needle valve extending downwardly from the actuating chamber to the nozzle orifice, a seal located between the actuating chamber and the dispensing chamber, the seal having an internal bore surrounding an outer surface of the needle valve, the seal having an upper, disc-like portion and a tubular extension, the upper disc-like portion being secured to the fixed housing by a clamping ring, a lower end of the tubular extension intimately gripping the outer surface of the needle valve and being longitudinally movable with the needle valve.

4. The dispensing device of claim 3 wherein the internal bore of the seal has a tapered configuration with a broadest cross section adjacent to the upper, disc-like portion and a narrowest cross section adjacent to the lower end of the tubular extension.

5. The dispensing device of claim 3 further comprising an annular skirt portion extending from the disc-like portion of the seal.

* * * * *